Nov. 7, 1950 R. O. HANSON ET AL 2,528,826

RECORDING EQUIPMENT HAVING AN ADJUSTABLE ADVANCE BALL

Filed July 15, 1948

Inventors
RUSSELL O. HANSON
WILLIAM F. SAARS

By [signature]

Attorney

Patented Nov. 7, 1950

2,528,826

UNITED STATES PATENT OFFICE 2,528,826

RECORDING EQUIPMENT HAVING AN ADJUSTABLE ADVANCE BALL

Russell O. Hanson, Los Angeles, Calif., and William F. Saars, East Haven, Conn., assignors to the United States of America as represented by the Secretary of the Navy Application July 15, 1948, Serial No. 38,878

2 Claims. (Cl. 274—25)

This invention relates to improvements in sound recording equipment, and particularly, but not exclusively, to sound recording equipment such as is used in sound detection apparatus for under-water ordnance. More specifically stated, the invention comprises a contrivance for suspending a round-ended pin, herein known as an advance ball, and so orienting it in reference to the cutting stylus as to respectively insure a uniform depth of cut by the stylus regardless of how violent the vibrations may be, and to avoid conflict of the advance ball with the chip from the sound track during all types of recording.

It is important in recording to keep the depth of cut of the stylus uniform. No difficulty is encountered in this respect in permanent recorder installations where heavy, carefully adjusted equipment is mounted on a solid base. However, in portable recorders of the type on which this description is based, or in other installations on foundations which are not rigid enough to isolate the equipment from vibration or shock, some means must be provided to prevent vertical movement of the cutter head and disk.

For this purpose use is made of the previously mentioned advance ball. This ball is carried by the cutter head as closely as possible to the stylus and allowed to rest upon and ride the disk, thus to derive some support for the cutter head and to provide a sort of loose coupling between the cutter head and disk to effectively keep the cutter head and disk in an established relationship and to eliminate the effect of vibration insofar as the latter tends to make the cutter head jump off the disk. Since the stylus projects below the level of the advance ball by an amount equal to the desired depth of cut, it follows that the cutting point will consistently engrave the sound track at a uniform depth.

This engraving is desirably settable to minutely varying depths so as to meet changing conditions such as are apt to be currently encountered, thereby bespeaking the need of adjusting the advance ball for various depths of cut of the stylus below it. The facility of adjustment must be and is introduced without interfering with the loose coupling between the cutter head and disk.

The position of the advance ball with respect to the stylus is governed by several factors. It may not run on that portion of the disk which has been engraved, as this will damage the sound track. It must also be kept clear of the continuous chip from the stylus, and, since it embosses a shallow depression in the disk by virtue of bearing on it, the advance ball must be so located that the stylus will later remove the depression in engraving the record.

Records are engraved at either of two speeds, 33⅓ or 78 revolutions per minute, and may be cut either from the outside inward or from the inside outward. When the cut is from the inside outward there is not much difficulty with the chip as the stylus is normally designed to throw the chip inward, and the advance ball will be just ahead of and outside the stylus. However, when the cut is from the outside inward, the advance ball must be on the same side of the stylus as the chip, and it must be so placed that under no condition will it pick up the chip.

When a recorder is set up permanently for cutting at one speed, the location of the advance ball can be permanently set. A change of speed changes the direction in which the chip leaves the stylus and the advance ball must be shifted accordingly. The existing and known arrangement of cutter heads provides no more than two alternative positions for the advance ball. This facility is inadequate to meet the requirements of adjusting the depth of cut or of locating the advance ball in reference to the stylus thereby to make sure of its avoiding the particles of the chip under any chosen speed of cutting.

Therefore, an object of the invention is to provide for varying the depth of cut of the stylus with extreme accuracy, at the same time maintaining a fixed relationship between the cutter head and disk, and in addition to provide for setting the advance ball in any one of an infinite number of positions around the stylus.

Another object of the invention is to provide an advance ball mount which affords a loose and adjustable coupling between the cutter head and disk for the purposes of establishing a connection between the cutter head and disk and of enabling the regulation of the depth of cut of the stylus.

Other objects and many of the attendant advantages of this invention will be readily appreciated as the same becomes better understood by reference to the following detailed description when considered in connection with the accompanying drawings wherein.

Figure 1:
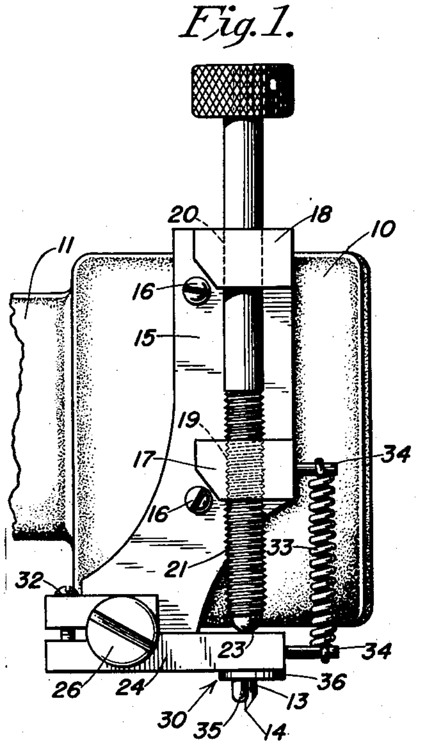
Fig. 1 is a side elevation of a cutter head and a portion of its arm, showing the invention in place on the cutter head.
Figure 2:
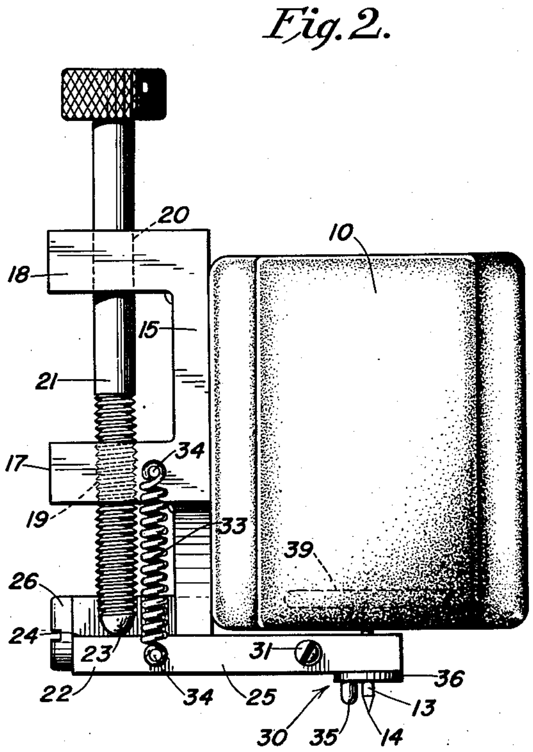
Fig. 2 is a front elevation of the cutter head, illustrating another aspect of the invention.

Known parts of sound detection and recording equipment with which the invention is directly concerned, consist of the cutter head 10 and its arm 11 by which the cutter head is so hung on a support as to be able to swing in an arc over the disk 12 from a place near the center to the periphery, or vice versa. The cutter head has a stylus 13, the cutting point 14, of which is adapted to engrave the disk for the production of a sound track.

The invention comprises a bracket 15 which is rigidly and permanently secured to one side of the cutter head 10 by such means as screws 16. This bracket has lugs 17 and 18 extending laterally from it, provided with vertically registering holes of which one, 19, is threaded and the other, 20, is smooth. A set screw 21 is guided in the smooth hole while it is turned in the threaded hole to adjust an arm 22, herein known as the advance ball mount, mainly through the bearing of its blunt point 23 on the junction of the members 24 and 25 which characterize the arm as of L-shape.

Figures 3, 4, 5:
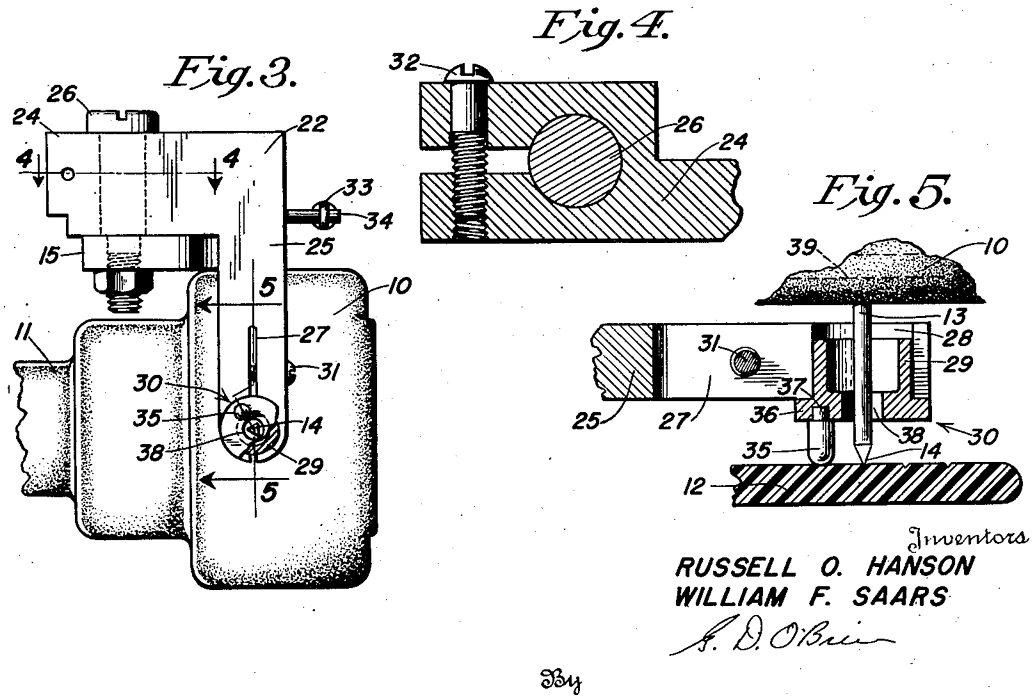
Fig. 3 is an inverted plan view of the cutter head, illustrating the orientable relationship of the advance ball to the stylus.
Fig. 4 is a detail section taken on the line 4—4 of Fig. 3.
Fig. 5 is a section taken substantially on the line 5—5 of Fig. 3.

A screw 26, or an equivalent of it, driven into the lower end of the bracket 15 pivotally supports the member 24 of the L-arm 22 in such a way as to swingably extend the other member 25 under the cutter head 10 and in intersecting relation to the stylus 13. That end of the member 25 is forked at 27 and has a circular socket 28 (Fig. 5) which is largely occupied by the sleeve 29 of the advance ball carrier 30. A set screw 31 driven through the fork, enables clamping the advance ball carrier 30 in any one of its infinite adjustments in respect to the stylus. A set screw 32 driven across the appropriately forked part of the member 24 (Fig. 4), is adapted to clamp the mount 22 in its adjusted positions on the pivot 26.

A coil spring 33, stretched between pins 34 respectively on the bracket 15 and the mount 22, keeps the mount in contact with the screw point 23. Thus far, it is readily understood that turning the set screw 21 in one direction or the other swings the mount 22 on its pivot 26 either by the pressure of the point 23 against the mount or by the contraction of the spring 33, so as to lower or raise the member 25 in respect to the cutter head 10. The slightly arcuate path that the member takes in making these movements has no effect on the nature of the adjustment of the advance ball 35. Adjustment is important because of the previously mentioned infinite number of settings which it provides for the advance ball. Said advance ball is made of some wear-resistant material such as sapphire, the radius of the rounded part thereof being so proportioned that the indentation which it makes in the surface of the disk 12 is approximately the same as the width of the groove cut by the stylus. The exposed flange 36 of the sleeve 29 limits the insertion of the sleeve in the socket 28 and provides a setting for the advance ball. For that purpose there is an opening 37 in which the advance ball is fastened by some suitable means, for example, jeweler's cement.

A hole 38 through the center of the flange 36 provides a passageway for the stylus and is large enough to accommodate the maximum excursion of the stylus and the armature 39 of the cutter head. The armature is so fixed in the cutter head that it will vibrate in response to incoming sound vibrations, and the stylus depends from the armature in cutting relationship to the record disk, as shown.

In use the device is secured to the cutter head 10 in such a manner that the stylus 13 projects through the center of the hole 38 in the flange 36 of the sleeve 29. The screw 31 is loosened and the sleeve 29 is turned annularly with respect to the cutting point until the advance ball 35 is oriented to the desired position in reference to the stylus, whereupon the screw is retightened to clamp the sleeve. Then the set screw 21 is turned to adjust the advance ball 35 for the proper depth of cut, by causing the mount 22 to move up or down substantially axially with respect to the cutting point 14.

It is evident that the orientation of the advance ball 35 around the stylus is not limited to any single position. Bearing in mind that the advance ball must be so placed that it will not pick up the chip from the stylus, especially when the progress of the sound groove is from the outside of the disk inward, it can be appreciated that the vernier adjustment that the sleeve 29 affords is an essential contribution toward setting the advance ball at the precise point where it will clear the innermost fringe of the chip.

While the instant disclosure is that of a preferred embodiment, obviously modifications and variations of the present invention are possible in the light of the above teachings. It is therefore to be understood that within the scope of the appended claims the invention may be practiced otherwise than as specifically described.

What is claimed is:

1. In sound recording equipment, a cutter head having a cutting stylus, an advance ball for supporting the stylus on a record disk, a mount for the advance ball, being attached to the cutter head and extending into proximity to the stylus, means for adjusting the mount in reference to the cutter head thereby to change the elevation of the advance ball in reference to the cutting point of the stylus and set the depth of cut, and carrier means for the advance ball, being turnable in the mount annularly of the stylus to orient the advance ball along a path which completely encircles said cutting point.

2. In sound recording equipment, a cutter head having a cutting stylus, a bracket secured to the cutter head and having an adjusting screw, a mount hinged to the bracket and having a spring holding it against the point of the adjusting screw, said mount including a member extending beneath the cutter head and having a socket through which the stylus is centered, an advance ball for supporting the cutter head and positioning the stylus on a record disk, and a sleeve turnable in the socket to orient the advance ball, said sleeve having a flange limiting the insertion of the sleeve in the socket and providing a setting for the advance ball.

RUSSELL O. HANSON.
WILLIAM F. SAARS.

REFERENCES CITED

The following references are of record in the file of this patent:

UNITED STATES PATENTS

| Number | Name | Date |
|---|---|---|
| 1,046,414 | Edison | Dec. 3, 1912 |
| 1,131,782 | Holland | Mar. 16, 1915 |
| 1,444,477 | Miller | Feb. 6, 1923 |
| 1,711,690 | Richard | May 7, 1929 |
| 1,874,101 | Head | Aug. 30, 1932 |
| 2,086,934 | Bonneau | July 13, 1937 |
| 2,242,803 | Thompson | May 20, 1941 |
| 2,259,275 | Stone | Oct. 14, 1941 |
| 2,491,215 | Roys | Dec. 13, 1949 |

FOREIGN PATENTS

| Number | Country | Date |
|---|---|---|
| 465,528 | Germany | Sept. 25, 1928 |